United States Patent
Bhagavathy et al.

(10) Patent No.: US 8,532,375 B2
(45) Date of Patent: Sep. 10, 2013

(54) IDENTIFYING BANDING IN DIGITAL IMAGES

(75) Inventors: Sitaram Bhagavathy, Plainsboro, NJ (US); Joan Llach, Princeton, NJ (US); Zhai Jie Fu, Plainsboro, NJ (US)

(73) Assignee: Thomson Licensing, Issy-les-Moulineaux (FR)

( * ) Notice: Subject to any disclaimer, the term of this patent is extended or adjusted under 35 U.S.C. 154(b) by 805 days.

(21) Appl. No.: 12/448,966

(22) PCT Filed: Jan. 18, 2008

(86) PCT No.: PCT/US2008/000680
§ 371 (c)(1),
(2), (4) Date: Jul. 16, 2009

(87) PCT Pub. No.: WO2008/088871
PCT Pub. Date: Jul. 24, 2008

(65) Prior Publication Data
US 2010/0142808 A1   Jun. 10, 2010

Related U.S. Application Data

(60) Provisional application No. 60/885,768, filed on Jan. 19, 2007.

(51) Int. Cl.
G06K 9/00   (2006.01)

(52) U.S. Cl.
USPC .......................... 382/165; 382/170; 382/181

(58) Field of Classification Search
USPC ................. 382/160, 165, 170, 166, 100, 234, 382/176, 181; 375/E7.265; 250/208.1; 356/218; 435/283.1; 358/3.24, 1.15
See application file for complete search history.

(56) References Cited

U.S. PATENT DOCUMENTS

| | | | |
|---|---|---|---|
| 6,647,152 B2 | 11/2003 | Willis et al. | |
| 6,786,655 B2 * | 9/2004 | Cook et al. | 396/569 |
| 7,176,939 B2 | 2/2007 | Weitbruch et al. | |
| 7,339,632 B2 | 3/2008 | Weitbruch et al. | |
| 7,443,365 B2 | 10/2008 | Terai et al. | |

(Continued)

FOREIGN PATENT DOCUMENTS

| | | |
|---|---|---|
| CN | 1623165 A | 6/2005 |
| JP | 2005-37961 | 2/2005 |

(Continued)

OTHER PUBLICATIONS

European Search Report dated Jul. 15, 2009.

(Continued)

*Primary Examiner* — Anh Do
(74) *Attorney, Agent, or Firm* — Robert D. Shedd; Brian J. Dorini

(57) ABSTRACT

One or more implementations access a digital image and determine whether at least one portion of the digital image includes one or more bands having a difference in color. The determination is based on at least two candidate scales. One or more implementations access a digital image and assess at least a portion of the digital image for the existence of one or more bands having a difference in color. The assessing includes determining a fraction of pixels in the portion having a color value offset by an offset value from a color value of a particular pixel in the portion.

31 Claims, 3 Drawing Sheets

(56) References Cited

U.S. PATENT DOCUMENTS

| | | | |
|---|---|---|---|
| 7,747,100 B2 | 6/2010 | Kim et al. | |
| 8,131,066 B2* | 3/2012 | Hua et al. | 382/160 |
| 2001/0022852 A1 | 9/2001 | Gicquel et al. | |
| 2003/0076283 A1 | 4/2003 | Lai et al. | |
| 2003/0076335 A1 | 4/2003 | Lai et al. | |
| 2003/0142878 A1 | 7/2003 | Willis et al. | |
| 2004/0036799 A1 | 2/2004 | Weitbruch et al. | |
| 2004/0070590 A1 | 4/2004 | Lee et al. | |
| 2004/0109088 A1 | 6/2004 | Lee et al. | |
| 2005/0083343 A1 | 4/2005 | Weitbruch et al. | |
| 2005/0265628 A1 | 12/2005 | Takahashi | |
| 2006/0233456 A1 | 10/2006 | Ahn et al. | |
| 2007/0075928 A1 | 4/2007 | Takeuchi et al. | |
| 2007/0222712 A1 | 9/2007 | Chiaki et al. | |
| 2009/0304270 A1 | 12/2009 | Bhagavathy et al. | |

FOREIGN PATENT DOCUMENTS

| | | |
|---|---|---|
| JP | 2006-3881 | 1/2006 |
| JP | 2006-33469 | 2/2006 |
| WO | 2008/088901 A2 | 7/2008 |

OTHER PUBLICATIONS

Ahn et al., "Flat-Region Detection and False Contour Removal in the Digital TV Display," IEEE Int'l. Conference, Multimedia and Expo 2005 (ICME 2005), Amsterdam, The Netherlands, Jul. 6, 2005, Piscataway, NJ, USA, pp. 1338-1341, XP010843914.

Bhagavathy et al., "Multi-Scale Probabilistic Dithering for Suppressing Banding Artifacts in Digital Images," IEEE Int'l. Conference on Image Processing, 2007 (ICIP'07), Sep. 1, 2007, pp. IV-397-IV-400, XP031158739.

Chen et al., "Incorporating Human Visual Model and Spatial Sampling in Banding Artifact Reduction," Proceedings of the 2004 American Control Conference, Boston Massachusetts, Jun. 30-Jul. 2, 2004, ThM01.4, pp. 2642-2647.

Lee et al., "Two-Stage False Contour Detection Using Directional Contrast Features and Its Application to Adaptive False Contour Reduction," IEEE Transactions on Consumer Electronics, vol. 52, No. 1, Feb. 2006, pp. 179-188, XP-002476825.

International Search Report, dated Sep. 26, 2008.

US Office Action mailed Nov. 28, 2011, from U.S. Appl. No. 12/449,046, filed Jul. 20, 2009.

US Office Action mailed May 1, 2012, from U.S. Appl. No. 12/449,046, filed Jul. 20, 2009.

US Office Action mailed Jun. 29, 2012, from U.S. Appl. No. 12/449,046, filed Jul. 20, 2009.

Notice of Allowance mailed Sep. 20, 2012, from U.S. Appl. No. 12/449,046, filed Jul. 20, 2009.

Osiromoukhov, Victor, "A Simple and Efficient Error-Diffusion Algorithm", Proc. SIGGRAPH 2001 in ACM Computer Graphics, Jan. 1, 2001, pp. 567-572.

Roberts, L. G., "Picture Coding Using Pseudo-Random Noise". IRE Transactions on Information Theory, vol. IT-8, Feb. 1962, pp. 145-154.

Daly, S. J. et al., "Decontouring Prevention and Removal of False Contour Artifacts", Proc. SPIE International Society for Optical Engineering, vol. 5292, Jan. 1, 2004, pp. 130-149.

Joy, G. et al., "Reducing False Contours in Quantized Color Images", Computers and Graphics, vol. 20, No. 2, Jan. 1, 1996, pp. 231-242.

Floyd, R. W. et al., "An Adaptive Algorithm for Spatial Grayscale", Proc. the Society for Information Display, vol. 17, No. 2, Apr. 1, 1976, pp. 75-77.

* cited by examiner

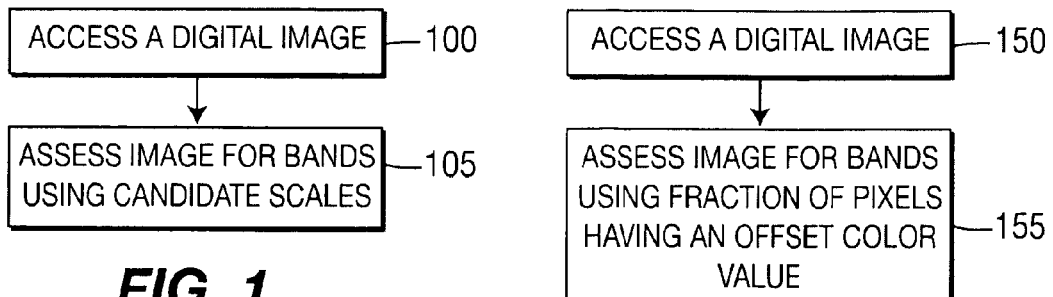
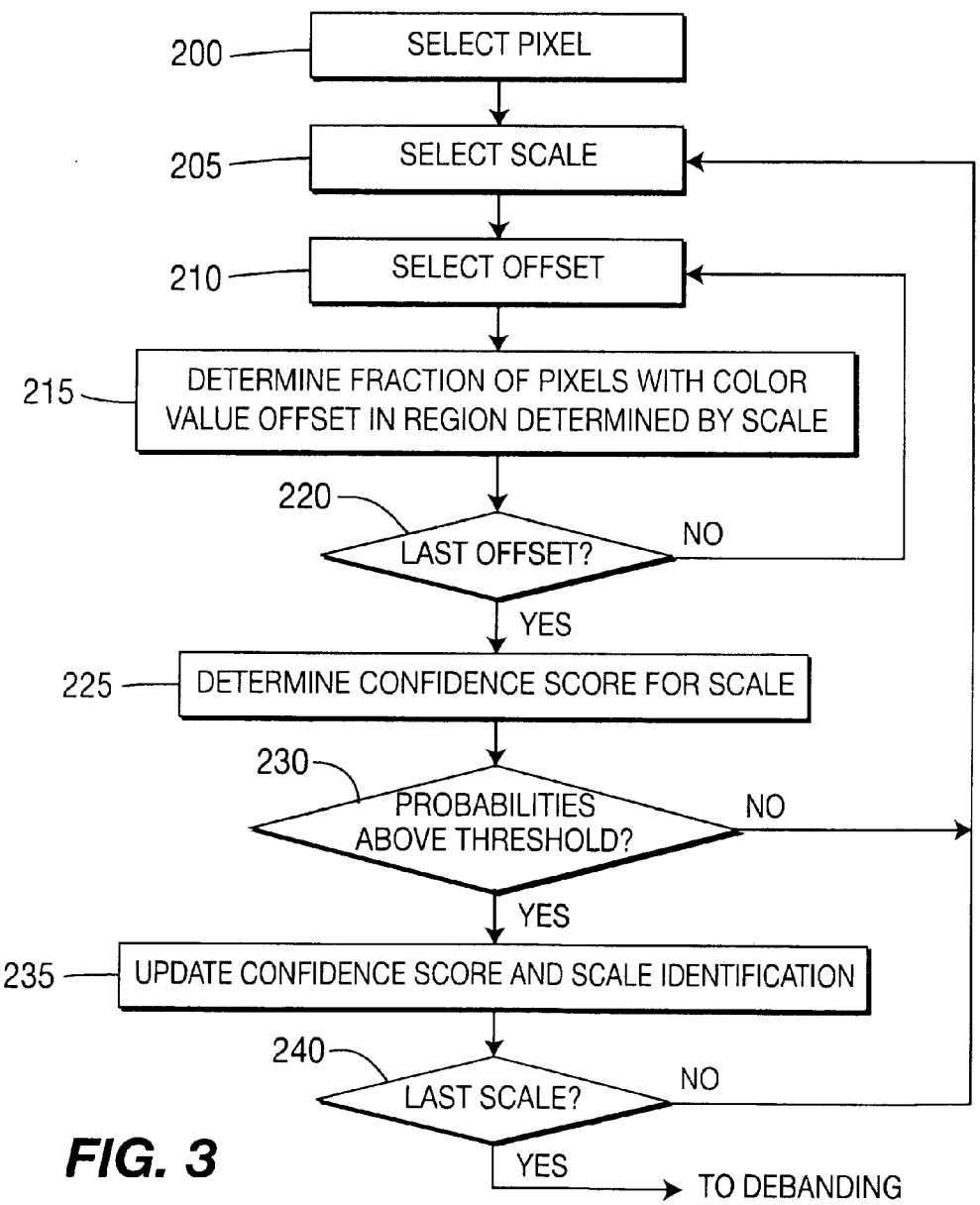

```
25  25  25  25  25  25  25         500
25  25  25  25  25  25  25
25  25  25  25  25  25  25         505
25  25  25  25  25  25  25         515
24  24  24  24  24  24  24
24  24  24  24  24  24  24         510
24  24  24  24  24  24  24
```

```
                                   500'
25  25  25  24  26  24  24
25  25  24  24  24  25  25         610
25  24  25  24  24  25  25
24  24  24  26  24  24  25
24  24  25  25  25  24  25
24  25  25  25  24  25  25
24  24  24  25  24  25  25         620
```

IDENTIFYING BANDING IN DIGITAL IMAGES

CROSS-REFERENCE TO RELATED APPLICATIONS

This application claims the benefit, under 35 U.S.C. §365 of International Application PCT/US2008/00680 and filed Jan. 18, 2008, which was published in accordance with PCT Article 21(2) on Jul. 24, 2008, in English and which claims the benefit of U.S. Provisional Patent Application No. 60/885,768, filed on Jan. 19, 2007, in English.

TECHNICAL FIELD

This disclosure relates to processing digital images.

BACKGROUND

In digital images, colors, including gray scale and black and white, are represented at various bit depths. For various reasons, the bit depth may be reduced. For example, film is often digitized during post-production, and the film is often digitized and processed at relatively high bit depths. Relatively high bit depths permit more colors to be represented. In some implementations, the digitized version of a film image has a relatively high bit depth of 10 bits per component (bpc) or higher. Content that is generated as digital images is often rendered at even higher bit depths, such as 16 bpc. One reason for reducing the bit depth is that images having a bit depth of 8 bpc are more desirable for compression, for use on standard definition and high definition consumer DVD players. The reduction of bit depth may be referred to as color quantization.

In areas of a high bit depth image with smooth color gradients, color quantization may produce "bands," each of which is constant in color, with a small color difference between adjacent bands. Boundaries between such bands may be visible as false contours, also referred to as "banding artifacts". Methods such as error diffusion aim at reducing the occurrence of false contours during the bit depth reduction process. However, one may be left with a quantized image with visible false contours. In some cases, the banding artifacts are already present in the higher bit depth image.

SUMMARY

According to a general aspect, a digital image is accessed. It is determined whether at least one portion of the digital image includes one or more bands having a difference in color. The determination is based on at least two candidate scales.

According to another general aspect, a digital image is accessed. At least a portion of the digital image is assessed for the existence of one or more bands having a difference in color. The assessing includes determining a fraction of pixels in the portion having a color value offset by an offset value from a color value of a particular pixel in the portion.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

BRIEF DESCRIPTION OF THE DRAWINGS

FIG. 1 includes a process flow diagram of an implementation of a method of band detection.

FIG. 2 includes a process flow diagram of another implementation of a method of band detection.

FIG. 3 includes a process flow diagram of an implementation of a method of band detection and determination of scale of bands.

DETAILED DESCRIPTION

One or more implementations provide a method of identifying bands in digital images. One or more implementations provide a method of reducing the visibility of contours in digital images. An example of an application in which bands may arise is bit depth reduction. An example of an application in which bit depth reduction is used is in preparing a signal for encoding according to a standard, such as a Moving Pictures Experts Group ("MPEG") standard (for example, MPEG-1, MPEG-2, or MPEG-4). Another example of an application in which bit depth reduction is used is in preparing a received signal for display.

An implementation addresses these challenges by identifying portions of a digital image where bands, and contours, are likely to be present. An implementation may also address these challenges by determining a scale of the bands, where the scale indicates the width of the bands. An implementation may apply an algorithm to at least a portion of the digital image for reducing visibility of at least one of the contours. Referring to FIG. 1, a method is illustrated for determining whether bands exist in a digital image. A digital image is accessed, as indicated by block 100. The digital image may include one or more bands having a difference in color. "Color" is understood to include the various colors, typically represented by pixel values, of gray scale and black and white. Additionally, a digital image may include multiple color components or merely a single color component (the single color component may represent, for example, a gray scale component or a traditional color component such as, for example, red, green, or blue).

Figure 5:
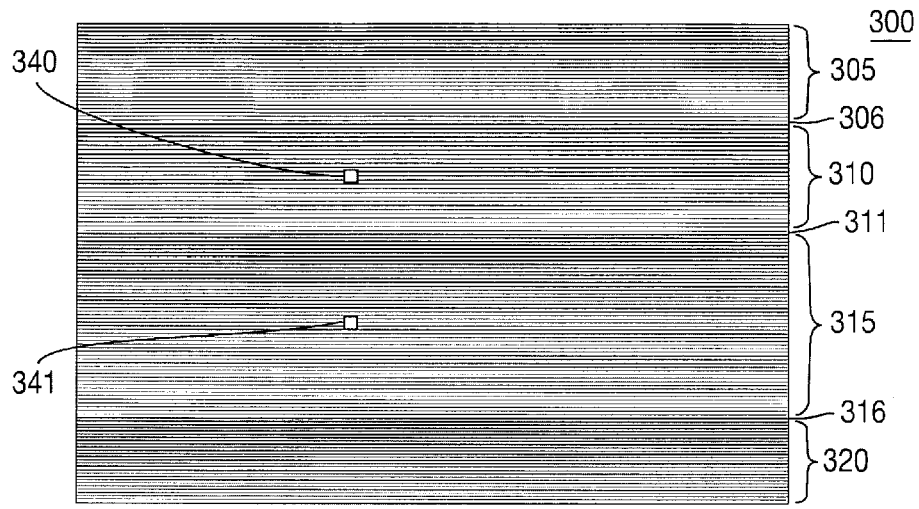
FIG. 5 includes a digital image that illustrates banding.

As an example of bands, referring to FIG. 5, image 300 is a gray scale image having multiple bands, the most visible of which are labeled 305, 310, 315, and 320. A difference in color between adjacent bands results in a contour between adjacent bands. In FIG. 5, the bands are separated by contours 306, 311, and 316. The digital image may include quantized pixels, and the bands may result from quantization artifacts. As an example of a quantization artifact, consider an image having a gradual change in color across a region. When the image is quantized to a lower bit depth (or when an analog image is initially digitized), the gradual change in color may turn into a series of regions of uniform color separated by bands at which the color changes from one value to an adjacent value.

At least one portion of the digital image is assessed, that is, analyzed, for the existence of one or more bands, based on at least two candidate scales, as indicated generally by block 105 of FIG. 1. The operation of assessing at least a portion of the digital image for bands may also include determining the scale of the bands. In various implementations, assessing may include determining in which portions or areas of a digital image bands exist, or are likely to exist.

Referring to FIG. 2, another method is illustrated for determining whether bands exist in a portion of a digital image. A digital image is accessed, as indicated by block 150. The digital image may include one or more bands having a difference in color. At least a portion of the digital image is assessed for the existence of bands, as indicated in block 155. The assessing step may include determining a fraction of pixels in the portion having a color value offset by an offset value from a color value of a particular pixel in the portion, as further indicated by block 155. Such an algorithm is explained further below.

If the result of assessing the digital image for the existence of bands results in a determination that bands exist, then the process flow may further include operations of, for example, determining a scale of the bands, and applying an algorithm based on the determined scale to reduce the bands. The algorithm may be a dithering algorithm that changes the value of the color value of one or more pixels or components of pixels.

Reducing a contour is typically referred to as reducing the visibility of a contour. A contour generally can be characterized as an edge or a line. The visibility of a contour is reduced if, for example, the contour is less visible to a viewer, the transition in pixel values across the contour is reduced on average across the contour, and/or the length of the contour is reduced. Reducing the visibility of a contour may give the appearance of breaking up the contour.

Referring to FIG. 3, a process flow diagram is shown for a method of assessing at least a portion of a digital image for the existence of one or more bands. In this implementation, an estimate is made of a scale that is most likely for the banding. At the most likely scale, a determination is made of whether there is a sufficient likelihood of banding.

In an implementation, a determination of the most likely scale of banding is made at one or more pixels in the image. A determination of the scale may be made on a pixel-by-pixel basis for multiple pixels in the image. A determination may be made on a pixel-by-pixel basis for each pixel in the image, or for some portion of the pixels in the image. Referring to block 200, a process flow may commence by selecting a first pixel for consideration. The process flow may continue by selecting a first scale, as indicated by block 205. A scale may represent a size of a region or neighborhood including the pixel to be evaluated for banding. The shape of the region may be of any shape. By way of example, the neighborhood may be circular and centered on the pixel. By way of example, the neighborhood may be rectangular in shape. In one example, a first scale may correspond to a neighborhood having a square shape and dimensions of 5 pixels by 5 pixels; a second scale may correspond to a neighborhood of 10 pixels by 10 pixels; a third scale may correspond to a neighborhood of 15 pixels by 15 pixels. The size of the neighborhood, and the relative size of the neighborhoods, may vary.

As indicated by block 205, a candidate scale is selected for the particular pixel. A region (or neighborhood) is then determined, based on the candidate scale. An offset value is then selected, as indicated by block 210. The fraction of pixels within the determined region having a color-value offset from a color value of the particular pixel by a first offset value is then determined, as indicated by block 215. By way of example, a first offset-value may be positive 1. Operation 215 determines, using the offset of 1, the fraction of pixels within the region that have a pixel-value (color-value) that is one more than the pixel-value of the first pixel selected in operation 200.

If the selected offset (210) is not the last offset value for the particular pixel and the candidate scale, as indicated by block 220, then the process flow moves to the next offset value for that particular candidate scale and that particular pixel. Moving to the next offset value is indicated by the "NO" branch of decision block 220. An implementation may use any of a variety of possible offset values.

For example, the offset values may be chosen to be positive 1, 0, and negative 1. The process would then loop through all three of these offset values, for the particular pixel and scale. It will be appreciated that other and additional integral offset values may also be used. As the existence of banding in a region around a pixel will generally be reflected in a large proportion of pixels having the same color value, or a color value only one different from the color value of a pixel, the use of these three offset values may be desirable.

After the fraction is determined in operation 215 for each of the possible offset values (for the selected scale and pixel), a confidence value is obtained, as indicated by block 225. In various implementations, the confidence value may be obtained by multiplying a factor indicating the visual significance of a banding artifact, by a factor indicating the likelihood of banding being present. Thus, even if banding is likely to be present, if the likelihood of visual significance of the banding artifact is low, the confidence factor will be low, indicating that there is a relatively low justification for applying a debanding process to the image. Similarly, if the likelihood of the existence of banding within the region is low, there will be a relatively low justification for applying a debanding process to the image.

In one implementation, the confidence value c(s) is represented as follows:

$$c(s) = p(0, s) \times \left[ \frac{p(-1, s)}{p(0, s) + p(-1, s)} + \frac{p(1, s)}{p(0, s) + p(1, s)} \right] \quad (1)$$

where:
  p(0,s) is the fraction or probability of pixels in the region defined by scale s having a color value the same as the particular pixel,
  p(−1,s) is the fraction or probability of pixels in the region defined by scale s having a color value that is one lower than the color value of the particular pixel, and
  p(1,s) is the fraction or probability of pixels in the region defined by scale s having a color value that is one higher than the color value of the particular pixel.

Equation 1 is of the general form described above. That is, equation 1 multiplies a first factor that indicates the visual significance of a banding artifact, by a second factor that indicates the likelihood of banding being present.

The fraction of pixels in the region having the same color value is a measure of the visual significance of banding artifacts as noted above. If the value of p(0,s) is low, then relatively few pixels have the same color value as the selected pixel. As a result, if the region includes a band representing a transition of a change of one in color value from the selected pixel, then that band has a reduced likelihood of being visible.

The term $$\left[\frac{p(-1,s)}{p(0,s)+p(-1,s)} + \frac{p(1,s)}{p(0,s)+p(1,s)}\right] \text{ in}$$ Equation (1)

represents the likelihood of banding being present. This term may be stated as the sum of two fractions. The first fraction is a fraction of pixels having a color value one less than the selected pixel, divided by the sum of the fraction of pixels having either the same value or a value one less than the value of the pixel. The second fraction is a fraction of pixels having a color value one greater than the color value of the selected pixel, divided by the sum of the fraction of pixels having either the same value or a value one greater than the value of the pixel. If a large number of pixels in a region vary in color value by 1 from the selected pixel, then one of the fractions will have a relatively high value, and the term will have a relatively high value. A large number of pixels varying by a value of 1 from one another is a characteristic of a region that includes bands. On the other hand, if the value of this term is low, then there are relatively few pixels with a color value varying by 1 from that of the selected pixel, which indicates a low likelihood of banding in the region.

Alternatively, the term $$\left[\frac{p(-1,s)}{p(0,s)+p(-1,s)} + \frac{p(1,s)}{p(0,s)+p(1,s)}\right]$$

may be replaced by max $$\left[\frac{p(-1,s)}{p(0,s)+p(-1,s)}, \frac{p(1,s)}{p(0,s)+p(1,s)}\right].$$

This alternative term also has a relatively high value if there is a relatively high fraction of pixels having a color value differing from that of the selected pixel by one. This alternative form focuses only on the largest of the two terms because either of the two terms may give rise to banding without regard for the other term. That is, if there is a large percentage of pixels offset by +1 (for example), then banding may be presumed to occur whether or not there is a large percentage of pixels offset by −1 (for example).

The alternative term may be desirable in avoiding a high confidence score in regions lacking banding, but having a relatively high number of pixels having a color value close to that of the selected pixel. For example, in one example in which there is no banding neither term is particularly large, however the sum is large enough to suggest (incorrectly in this example) that banding is present.

After obtaining the confidence score for the scale, the process flow may proceed to a step of reducing the risk of improperly identifying regions as having bands. This step may include determining whether the fraction of pixels having the same color value as the selected pixel (p(0,s)) is at least a threshold, and whether the fraction of pixels having either the color value one greater (p(1,s)), or the color value one less (p(−1,s)), is at least a threshold. If there is a band in the region, these fractions will be relatively high. The thresholding step is indicated in FIG. 3 by block 230. The thresholding step may be represented by the equation:

$$p(0,s)>T \text{ and } [p(-1,s)>T \text{ or } p(1,s)>T] \quad (2)$$

where T is a fractional threshold. In some implementations, T may have a value of 0.2, but the value of T may vary. Implementations may also vary the value of T used for p(0,s) from the value of T used for p(−1,s) and p(1,s). More generally, implementations may include any number of offset values (equation 2 shows the two offset values of −1 and 1), and may include a different threshold for each offset value as well as for p(0,s) (no offset value).

If the thresholding step shows that banding is not likely at this scale, then the process flow proceeds to the next scale, as indicated by the "NO" branch out of decision box 230. If the thresholding step is successfully passed, then the confidence value is compared to the highest confidence value for that pixel. If the confidence value is higher than the highest stored confidence value, then the confidence value and the scale are stored. This updating step is shown by block 235. The process flow then proceeds to the next scale, unless the last scale has been checked, as indicated by block 240. If none of the scales satisfies the threshold criterion in block 230, it is concluded that banding is absent at the selected pixel. However, if at least one scale satisfies the threshold criterion in block 230, then banding is determined to be present at the selected pixel and in the region corresponding to the scale with the highest confidence.

It will be appreciated that banding may exist in each component of each pixel of a color image. Accordingly, the process flow may be repeated for each component of each pixel. Thus, for YUV or RGB images, the process is repeated three times for each pixel. There are three color values associated with each pixel in a YUV or RGB image. In a gray scale image, there is only one color value associated with each pixel.

In other implementations, each region is assessed for the likelihood of banding at only one scale. In another implementation, a digital image may be arbitrarily divided into one or more portions, and at least one of the portions may be assessed for the likelihood of banding.

When the last scale has been identified, and banding is present in the image portion in the neighborhood of the selected pixel, then debanding may be conducted with respect to the particular pixel. In one implementation, a debanding process that is in part dependent on the determined scale is employed. Various implementations use a debanding process that includes probabilistic dithering of the pixel. The probabilities employed in the dithering may reflect the fractions of pixels (in the neighborhood corresponding to the determined scale) having the same color value as the pixel, and the fractions of pixels having color values offset by one from the pixel. As the human eye provides some averaging of colors, the effect will tend to be that the banded region has a color value intermediate to the quantized color values. The relative fractions (probabilities) of pixels with different color values determine approximately the mean color value perceived in the neighborhood.

Figure 4:
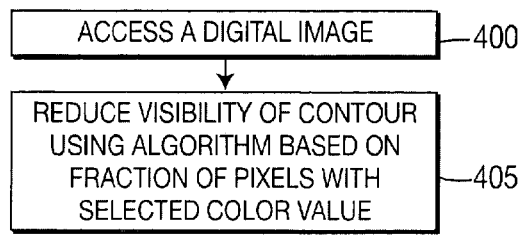
FIG. 4 includes a process flow diagram of an implementation of a method of reducing visibility of contours.

Referring to FIG. 4, a process flow diagram for reducing the visibility of bands in a digital image is shown. A digital image having one or more bands IS accessed, as indicated by block 400. The determination that the digital image has bands may have been made by a process such as that described above with respect to FIG. 3, by another process, or manually by observation of the digital image. The visibility of one or more contours is reduced by applying an algorithm that is based on a value representing the fraction of pixels in a region of the digital image having a particular color value, as indicated by block 405. The algorithm is applied to at least a portion of the digital image. The dithering algorithm may include probabilities based on a fraction of pixels in a region of the digital image having a color value offset by an offset value.

In various implementations, a most-likely banding scale, such as a scale determined to be "most likely" by a process explained above with reference to FIG. 3, is used. In one such implementation, a most likely scale is used, and a probabilistic dithering process maps the original color value for the pixel at the (x,y) location, I(x,y), to a new color value for the pixel at the (x,y) location, J(x,y), by generating a random number r, between 0 and 1, and using the following formula:

$$J(x, y) = \begin{cases} I(x, y) & \text{if } r < p'(0, s^*) \\ I(x, y) + 1 & \text{if } r \geq p'(0, s^*) \text{ and} \\ & r < p'(0, s^*) + p'(1, s^*) \\ I(x, y) - 1 & \text{if } r \geq p'(0, s^*) + p'(1, s^*) \end{cases} \quad (3)$$

The expression p'(k, s*)=p(k, s*)/[p(−1, s*)+p(0, s*)+p(1, s*)]. Thus, the sum of p'(−1, s*), p'(0, s*), and p'(1, s*) is 1, and the probability of the pixel having the original color value or one of the offset color values reflects the relative occurrence of those color values in the region defined by the scale. The value p'(0, s*) represents a fraction of pixels in a portion of the digital image having a color value equal to the color value of the particular pixel in the portion. The value p'(−1, s*) represents a fraction of pixels in a portion of the digital image having a color value offset from the color value of the particular pixel in the portion by an offset value, where the offset value is negative 1. The value p'(1, s*) represents a fraction of pixels in a portion of the digital image having a color value offset from the color value of the particular pixel in the portion by an offset value, where the offset value is positive 1. The scale s* may be the most likely scale of banding at pixel (x, y) determined by the process described above with reference to FIG. 3. The scale may alternatively be selected by another method.

In another implementation, a probabilistic dithering process employs the following approach. In this approach, the normalized probabilities of a pixel having an offset color value are adjusted and renormalized. The updated values are expressed as follows:

$$p'(-1, s^*) = \begin{cases} p'(-1, s^*) - p'(1, s^*) - \tau & \text{if } p'(-1, s^*) > \\ & (p'(1, s^*) + \tau) \\ \tau & \text{otherwise} \end{cases} \quad (4)$$

and $$p'(1, s^*) = \begin{cases} p'(1, s^*) - p'(-1, s^*) - \tau & \text{if } p'(1, s^*) > \\ & (p'(-1, s^*) + \tau) \\ \tau & \text{otherwise} \end{cases} \quad (5)$$

where τ is a constant having a relatively small value. These adjustments result in the value of the fraction having a higher value being reduced, and the value of the fraction having a lower value becoming a constant. If the values are close, then both are moved to a relatively low constant. The values are then renormalized. This renormalization step may employ the following formula:

$$p''(k, s^*) = \frac{p'(k, s^*)}{p'(-1, s^*) + p'(0, s^*) + p'(1, s^*)} \quad (6)$$

By this renormalization step, the renormalized fraction of pixels having the same color value as the particular pixel, and the renormalized fractions of pixels having the selected offset values, sum to 1. The renormalized fractions are then employed with a random number generator to obtain a dithered color value. The following formula may be employed:

$$J(x, y) = \begin{cases} I(x, y) & \text{if } r < p''(0, s^*) \\ I(x, y) + 1 & \text{if } r \geq p''(0, s^*) \text{ and} \\ & r < p''(0, s^*) + p''(1, s^*) \\ I(x, y) - 1 & \text{if } r \geq p''(0, s^*) + p''(1, s^*) \end{cases} \quad (7)$$

As above, r represents a random number between 0 and 1.

In a further implementation of a dithering method, an expected mean value of a color value of a pixel is calculated. An expected mean value may be represented as follows:

$$m = p'(-1,s^*)[I(x,y)-1] + p'(0,s^*)I(x,y) + p'(1,s^*)[I(x,y)+1] \quad (8)$$

The color value of the output pixel is either $\lfloor m \rfloor$, the highest integral value less than m, or $\lfloor m \rfloor + 1$. A probability factor q is determined as $q = m - \lfloor m \rfloor$. The output value is assigned the value $\lfloor m \rfloor + 1$ with probability q, and is assigned the value $\lfloor m \rfloor$ with probability (1−q). Employing a random number r with a value between 0 and 1, the color value J(x,y) may be determined as follows:

$$J(x, y) = \begin{cases} \lfloor m \rfloor + 1 & \text{if } r < q \\ \lfloor m \rfloor & \text{if } r \geq q \end{cases} \quad (9)$$

Thus, if m is closer to $\lfloor m \rfloor$ than to $\lfloor m \rfloor + 1$, then the value of q is relatively low, and r will in most cases be greater than q. When r is greater than q, the color value will be $\lfloor m \rfloor$. Accordingly, if m is closer to $\lfloor m \rfloor$ than to $\lfloor m \rfloor + 1$, then the color value is more likely to be $\lfloor m \rfloor$ than $\lfloor m \rfloor + 1$. If m is closer to $\lfloor m \rfloor + 1$ than to $\lfloor m \rfloor$, then the value of q is relatively high. As a result, r in most cases will be less than q. As a result, the color value in most cases is $\lfloor m \rfloor + 1$ if m is closer to $\lfloor m \rfloor + 1$ than to m.

In some implementations, the bit depth of an image may be increased at the point where band detection and debanding is performed. In this event, the method of debanding may be modified. If no banding has been detected at a pixel, then the output value may be set at:

$$J(x,y) = d_{min} * I(x,y)$$

where the factor $d_{min}$ is equal to 2 raised to the power of the difference of the bit depth. For example, if the bit depth is increased by one bit, then all I(x,y) values are doubled. If banding has been detected, the determination of the mean value of the color value may be modified to:

$$m = d_{min}(p'(-1,s^*)[I(x,y)-1] + p'(0,s^*)I(x,y) + p'(1,s^*)[I(x,y)+1]) \quad (11)$$

The dithering step is the same as that described in Equation (9). The values of the integer below the mean value and the integer above the mean value will be closer than in an implementation where the bit depth remains the same. Thus, this implementation further smoothes the transition change in color value.

In an implementation in which both banding detection and banding reduction are performed, after completion of the step of dithering, the process flow may proceed to a determination of banding for the next pixel. If a color image is involved, the process flow may proceed to the next color value for the same pixel, or, if all color values for the pixel have been completed, then to the next pixel.

Figures 7, 8, 9:
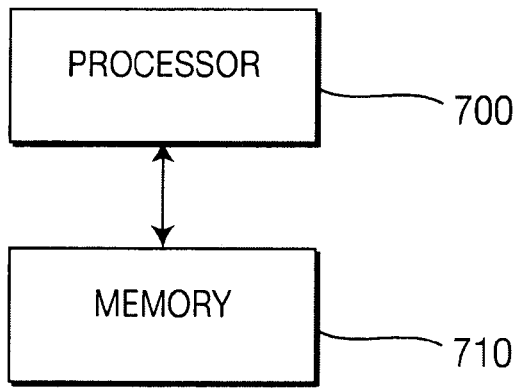
FIG. 7 includes a plot of color values, of a portion of a digital image, that reveal banding.
FIG. 8 includes a plot of the color values of FIG. 7 after application of an implementation of a method of band detection and a method of reducing visibility of contours.
FIG. 9 includes a simplified block diagram of an implementation of an apparatus for performing a method of band detection and a method of reducing visibility of contours.

Referring to FIG. 7, color values for pixels in a portion of an image 500 are shown. Pixels in band 505 have a color value of 25, and pixels in band 510 have a color value of 24. In FIG. 8, image 500' is shown. Image 500' is the result of applying an implementation of a method of detecting banding and debanding. In FIG. 8, the result of a step of dithering color values may be seen. The color values vary gradually from a relatively higher average value at the top line 610 to a relatively lower value at the bottom line 620.

Bands 505 and 510 in FIG. 7 can be seen to produce a contour 515. Contour 515 is a straight line across the entirety of image 500, and is a result of the one pixel-value difference between band 505 and band 510. The facts that contour 515 is a straight line, and extends across the entirety of image 500, both generally tend to increase the visibility of contour 515. In contrast, image 500' has no such contour because the dithering has removed contour 515. In producing image 500', the dithering algorithm has done more than merely dither the pixels immediately adjacent contour 515 in image 500. Rather, the dithering algorithm, at least in this implementation, has dithered pixels in all rows and columns of image 500. Other implementations need not dither as extensively, of course.

FIG. 9 is a simplified block diagram showing a processor 700 and a memory 710. Processor 700 may be configured to implement the steps of a method set forth in one or more implementations described herein. For example, processor 700 may be configured to assess a portion of an image for the existence of bands, and/or determine whether a portion of an image has bands. Memory 710 may include program code which includes instructions for causing processor 710 to carry out such process steps. Memory 710 may also include memory locations for storing digital images before and after the steps of band detection and debanding.

In an implementation, the steps of detecting banding and debanding regions of an image where banding is detected may be performed in an encoder. For example, the steps may be performed prior to a step of encoding according to a compression standard, such as the MPEG-2 digital compression standard.

The steps of detecting banding and debanding regions of an image where banding is detected may be performed in, for example, a decoder, or a post-processor after decoding. For example, the steps may be performed after a step of decoding an image from a compressed video stream, and prior to furnishing the stream to a display driver. At least two implementations are structured in this manner. A first implementation uses a display that operates at a lower bit depth than the decoder's output image. In this first implementation, the decoder's output image is reduced in bit depth prior to or during the process of detecting banding and debanding. A second implementation uses a display that operates at a higher bit depth than the decoder's output image. In this second implementation, the decoder's output image is increased in bit depth prior to or during the process of detecting banding and debanding.

The steps of detecting banding and debanding regions of an image where banding is detected may be performed in, for example a filter. For example, the steps may be performed after filtering steps have been performed on an image, and before the filtered image is output by the filter.

The steps of detecting banding and debanding regions of an image where banding is detected may be performed in, for example, an encoder, or a pre-processor before encoding. For example, color quantization may be performed on an image to reduce the amount of data to be encoded. Following the color quantization, and before encoding the image, the steps of detecting banding and debanding may be performed.

Implementations may use offset values other than and in addition to −1, 0, and 1 for banding detection, determination of scale in banding detection, and/or for applying an algorithm to reduce banding.

Implementations of any of the dithering methods may, instead of dithering a pixel by ±1 color value, dither by ±n, where n>1.

In any of the dithering methods, when processing a sequence of digital images, a step of adding a temporal correlation factor to the dithering probability may be included. For example, for a given pixel $I(x, y, t)$, the method may take into account the dithering parameters of the pixel at the same location in the prior frame, i. e., pixel $I(x, y, t−1)$. For example, the dithering parameters of the collocated pixel in the previous frame could be taken into account while determining the dithering parameters of the current pixel. One way to do this is to add a temporal correlation factor that ensures that the dithering parameters of a pixel vary smoothly and not suddenly from frame to frame. In one implementation, rather than use the collocated pixel in the prior frame, the corresponding motion compensated pixel in the prior frame (i.e., $I(x−m_x, y−m_y, t−1)$ is employed.

In various implementations, a scale may be selected simultaneously for all color components of a pixel in a color image. By way of example, the calculation of the confidence score may take into account all color components, rather than just one component.

Figure 6:
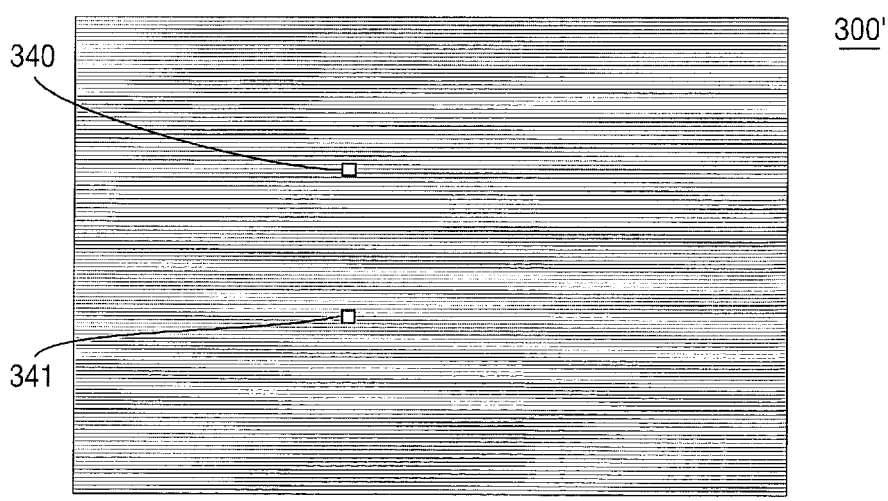
FIG. 6 includes the digital image of FIG. 5 after application of an implementation of a method of band detection and a method of reducing visibility of contours.

Implementations may include one or more of the following advantages: (1) reducing the visibility of banding artifacts of different scales, (2) reducing the visibility of banding artifacts in an output image having the same bit depth as the input image or at higher bit depths, (3) adding a relatively low level of noise, and (4) preserving fine detail in the image, including small details occurring in flat regions. For example, referring to FIG. 5, small contrasting areas 340, 341 are shown. Referring to FIG. 6, image 300' after application of an implementation is shown. Small contrasting areas 340, 341 remain visible.

The implementations described herein may be implemented in, for example, a method or process, an apparatus, or a software program. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of equipment include video coders, video decoders, video codecs, web servers, set-top boxes, laptops, personal computers, cell phones, PDAs, and other communication devices. As should be clear, the equipment may be mobile and even installed in a mobile vehicle.

Additionally, the methods may be implemented by instructions being performed by a processor, and such instructions may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a computer readable medium having instructions for carrying out a process.

As should be evident to one of skill in the art, implementations may also produce a signal formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the following claims.

The invention claimed is:

1. A method for identifying banding in a digital image comprising:
accessing the digital image;
determining by a processor for a particular pixel in the digital image, based on at least two candidate scales that represent sizes of regions that are evaluated for banding, whether at least one portion of the digital image includes one or more bands having a difference in color, the at least one portion including the particular pixel, and wherein determining whether at least one portion includes one or more bands further comprises:
determining, for the at least two candidate scales, a result indicating whether banding is present at the particular pixel; and
determining a most-likely scale of banding for the particular pixel based on the results for the at least two candidate scales.

2. The method of claim 1 wherein determining whether at least one portion includes one or more bands further comprises:
determining, for at least two candidate scales, a first fraction of pixels, in the region of the digital image that is based on the candidate scale being evaluated, having a color value offset by an offset value from a color value of the particular pixel;
determining, for at least two candidate scales, a second fraction of pixels, in the region of the digital image that is based on the candidate scale being evaluated, having a color value equal to the color value of the particular pixel; and
wherein determining the result for the at least two candidate scales is based on one or more of the first fraction and the second fraction for the respective candidate scale.

3. The method of claim 2 wherein determining the result for the at least two candidate scales comprises determining, for at least one of the candidate scales, whether one or more of the first fraction and the second fraction exceeds a threshold value.

4. The method of claim 1 further comprising:
determining that the digital image includes adjacent bands having a difference in color resulting in a contour between the adjacent bands; and
applying an algorithm to at least a portion of the digital image for reducing visibility of the contour, the algorithm being based on a value representing the fraction of pixels in a region of the digital image having a particular color value.

5. The method of claim 4 wherein applying the algorithm comprises dithering pixels in the portion using a dithering algorithm that selects a color value for a pixel in the portion based on the value representing the fraction.

6. The method of claim 1 wherein the most-likely scale is indicative of a width of the one or more bands.

7. The method of claim 6 wherein the digital image includes multiple color components and determining the result for the at least two candidate scales is based on an evaluation of corresponding pixels in the multiple color components.

8. The method of claim 1 wherein the digital image is a single color component.

9. The method of claim 1 wherein the digital image includes quantized pixels, and the bands result from the quantization of the quantized pixels.

10. The method of claim 1 wherein the one or more bands includes two adjacent bands and the difference in color between the two adjacent bands results in a contour between the two adjacent bands.

11. The method of claim 1 wherein determining the results for the at least two candidate scales comprises determining a confidence score associated with the at least two candidate scales; and
determining the most-likely scale is based on confidence scores associated with the at least two candidate scales.

12. The method of claim 11 wherein determining the confidence score comprises using a two-part equation including a part indicating probability of banding and another part indicating visual significance of banding.

13. The method of claim 11 wherein determining the most-likely scale comprises selecting a scale having the largest confidence score that satisfies a thresholding test.

14. The method of claim 11 wherein the confidence score for at least one of the at least two candidate scales is determined by:

determining a region of pixels in the digital image based on the at least one candidate scale; and determining a confidence score for the at least one candidate scale based on color values of pixels in the determined region.

15. The method of claim 14 wherein determining a confidence score comprises determining a fraction of pixels having at least one selected color value in the determined region.

16. The method of claim 15 wherein the at least one selected color value is determined based on one or more selected offset values from a color value of at least one pixel in the determined region.

17. The method of claim 1 wherein the digital image corresponds to at least one component of a multi-component image.

18. The method of claim 1 wherein the candidate scales indicate width of bands.

19. A method for identifying banding in a digital image comprising:

accessing the digital image;

assessing by a processor at least a portion of the digital image for the existence of one or more bands having a difference in color, wherein assessing includes determining a fraction of pixels in the portion having a color value offset by an offset value from a color value of a particular pixel in the portion.

20. The method of claim 19 wherein assessing includes determining that there is at least one band in the portion if the determined fraction exceeds a threshold.

21. The method of claim 19 further comprising determining a second fraction of pixels in the image portion having a color value offset by a second selected value from the color value of the at least one pixel in the image portion.

22. The method of claim 21 wherein assessing comprises: comparing the determined fraction to a first threshold;

comparing the determined second fraction to a second threshold; and determining whether there is at least one band in the portion based on (1) a result of comparing the determined fraction to the first threshold and (2) a result of comparing the determined second fraction to a second threshold.

23. The method of claim 22 wherein determining whether there is at least one band comprises determining that there is at least one band in the portion if (1) the determined fraction exceeds the first threshold and (2) the determined second fraction exceeds the second threshold.

24. The method of claim 19 wherein the selected offset value is one.

25. The method of claim 19 wherein the one or more bands includes two adjacent bands and the difference in color between the two adjacent bands results in a contour between the two adjacent bands.

26. An apparatus for identifying banding in a digital image comprising:

means for accessing the digital image;

means for determining for a particular pixel in the digital image, based on at least two candidate scales that represent sizes of regions that are evaluated for banding, whether at least one portion of the digital image includes one or more bands having a difference in color, the at least one portion including the particular pixel, and wherein the means for determining whether at least one portion includes one or more bands further comprises:

means for determining, for the at least two candidate scales, a result indicating whether banding is present at the particular pixel; and means for determining a most-likely scale of banding for the particular pixel based on the results for the at least two candidate scales.

27. The apparatus of claim 26 further comprising a storage unit for storing the digital image.

28. The apparatus of claim 26 wherein the apparatus is part of an encoder.

29. The apparatus of claim 26 wherein the apparatus is part of a decoder.

30. The apparatus of claim 26 wherein the apparatus is part of a filter.

31. A non-transitory processor-readable medium having one or more executable instructions stored thereon, which when executed by a digital processing system cause the digital processing system to perform a method for identifying banding in a digital image, the method comprising:

accessing the digital image;

determining for a particular pixel in the digital image, based on at least two candidate scales that represent sizes of regions that are evaluated for banding, whether at least one portion of the digital image includes one or more bands having a difference in color, the at least one portion including the particular pixel, and wherein the means for determining whether at least one portion includes one or more bands further comprises:

determining, for the at least two candidate scales, a result indicating whether banding is present at the particular pixel; and determining a most-likely scale of banding for the particular pixel based on the results for the at least two candidate scales.

* * * * *